United States Patent
Miao et al.

(10) Patent No.: US 9,379,866 B2
(45) Date of Patent: Jun. 28, 2016

(54) METHOD FOR TRANSMITTING CPC INFORMATION, RADIO ACCESS METHOD AND SYSTEM BASED ON CPC INFORMATION

(75) Inventors: Ting Miao, Shenzhen (CN); Feng Li, Shenzhen (CN); Yan Li, Shenzhen (CN); Xing Liu, Shenzhen (CN); Dong Zhou, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 245 days.

(21) Appl. No.: 14/008,113

(22) PCT Filed: Dec. 2, 2011

(86) PCT No.: PCT/CN2011/083392
§ 371 (c)(1),
(2), (4) Date: Sep. 27, 2013

(87) PCT Pub. No.: WO2012/129927
PCT Pub. Date: Oct. 4, 2012

(65) Prior Publication Data
US 2014/0010100 A1    Jan. 9, 2014

(30) Foreign Application Priority Data

Mar. 28, 2011   (CN) .......................... 2011 1 0075531

(51) Int. Cl.
*H04W 4/00*    (2009.01)
*H04B 7/00*    (2006.01)
(Continued)

(52) U.S. Cl.
CPC .............. *H04L 5/005* (2013.01); *H04L 5/0048* (2013.01); *H04L 25/0226* (2013.01)

(58) Field of Classification Search
CPC ..... H04L 5/0048; H04L 5/005; H04L 5/0051; H04L 25/0226; H04W 48/10
See application file for complete search history.

(56) References Cited

U.S. PATENT DOCUMENTS

2008/0171552 A1   7/2008  Hyon
2011/0070885 A1   3/2011  Ruuska et al.
(Continued)

FOREIGN PATENT DOCUMENTS

CN   1972495 A   5/2007
CN   1996784 A   7/2007
(Continued)

OTHER PUBLICATIONS

International Search Report in international application No. PCT/CN2011/083392 mailed on Mar. 15, 2012. (2 pages).
(Continued)

*Primary Examiner* — Dang Ton
*Assistant Examiner* — Ryan Kavleski
(74) *Attorney, Agent, or Firm* — Oppedahl Patent Law Firm LLC

(57) ABSTRACT

The disclosure provides a method for transmitting Cognitive Pilot Channel (CPC) information, a radio access method and system based on CPC information, wherein the method for transmitting CPC information includes: dividing a CPC into a primary CPC for transmitting primary CPC information and a secondary CPC for transmitting secondary CPC information; loading the primary CPC information periodically into fixed physical resources, and sending the primary CPC information to a user equipment; after a base station receives a preset triggering event, loading the secondary CPC information into variable physical resources, and sending the secondary CPC information to the user equipment. In the disclosure, the base station loads the primary CPC information into fixed physical resources of an RAT according to an RAT coverage condition, reducing the amount of information required to be delivered by fixed physical resources, decreasing occupation of fixed physical resources, speeding up radio access of the user equipment; and after receiving a triggering event, the base station loads the secondary CPC information into variable physical resources and sends the secondary CPC information to the user equipment, thus implementing optimization of a user network and radio resources.

14 Claims, 4 Drawing Sheets

(51) Int. Cl.
*H04L 5/00* (2006.01)
*H04L 25/02* (2006.01)

(56) References Cited

U.S. PATENT DOCUMENTS

2011/0244903 A1* 10/2011 Sagae et al. .................. 455/507
2011/0263250 A1* 10/2011 Mueck et al. ................. 455/434
2012/0108247 A1* 5/2012 Tring et al. ................... 455/446

FOREIGN PATENT DOCUMENTS

CN 101835169 A 9/2010
WO 2010128587 A1 11/2010

OTHER PUBLICATIONS

English Translation of the Written Opinion of the International Search Authority in international application No. PCT/CN2011/083392, mailed on Mar. 15, 2012. (6 pages).
Draft ETSI TR 102 683 V0.1.1, Reconfigurable Radio Systems (RRS); Cognitive Pilot Channel (CPC), Aug. 25, 2009.
Perez-Romero, Jordi et al., A Novel On-Demand Cognitive Pilot Channel enabling Dynamic Spectrum Allocation, Dept. Signal Theory and Communications, Universitat Politecnica de Catalunya, Barcelona, Spain, Apr. 1, 2007.
Salient, O et al, Cognitive Pilot Channel Enabling Spectrum Awareness,Dept. Signal Theory and Communications, Universitat Politecnica de Catalunya, Barcelona, Spain, Jun. 14, 2009.
Agusti, Ramon et al., Cognitive Pilot Channel, Universitat Politecnica de Catalunya, Sep. 17, 2008.
File, Marcin et al., Cognitive Pilot Channel: Enabler for Radio Systems Coexistence, Broadband and Wireless Group Create-Net International Research Center, Trento, Italy, May 18, 2009.
Supplementary European Search Report in European application No. 11862767.8, mailed on Jul. 28, 2014.
ETSI TR 102 683 V1.1.1, ETSI, mailed on Sep. 25, 2009.

* cited by examiner

METHOD FOR TRANSMITTING CPC INFORMATION, RADIO ACCESS METHOD AND SYSTEM BASED ON CPC INFORMATION

TECHNICAL FIELD

The disclosure relates to the technical field of wireless communication technology, and in particular to a method for transmitting Cognitive Pilot Channel (CPC) information, a radio access method and system based on CPC information.

BACKGROUND

With the continuous development of radio technology, a radio environment becomes increasingly complicated, and massive emergence of all sorts of radio traffics brings rich heterogeneity to a network. In a complicated radio environment, due to dynamic spectrum allocation and flexible spectrum management, a user equipment during starting up does not know the existing kinds of local Radio Access Technology (RAT), nor which one is the most suitable for use, nor which RAT can be used on which frequency point. In this case, the user equipment has to perform full frequency scanning to find a currently selectable radio access network and a corresponding operating frequency band, which is a time-and-power-consuming process. The user equipment needs to be handed over across networks under a working state, possibly for reasons such as a load or a Quality of Service (QoS) unable to meet a requirement, where a handover failure will immediately affect user experience, and even will lead to waste of network resources sometimes. Therefore, helping the user equipment quickly select a most suitable RAT is of great importance for improving radio resource utilization and a network QoS.

In an existing technology, CPC information may help the user equipment quickly select an appropriate RAT, and may also improve the network QoS through interacting sensing information. At present, there are three ways to bear the CPC information: out-of-band CPC, in-band CPC, out-of-band and in-band hybrid CPC; wherein the out-of-band CPC uses a global public frequency point and a brand new modulation and demodulation technology to broadcast to the user equipment in a covered area in the form of large cell broadcast; given that the frequency point used by the out-of-band CPC requires coordination within a large range, and a large cell coverage tends to generate a coverage loophole, in the case of a relatively large pilot channel data flow, a usual in-band CPC probably will increase the volume of a downlink broadcast channel, and occupy more fixed physical resources. Therefore, a problem needing to be solved is how to transmit the CPC information better, so as to implement fast access of the user equipment without causing too much negative effect on the network.

SUMMARY

In view of this, a main objective of the disclosure is to provide a method for transmitting CPC information, a radio access method and system based on CPC information, capable of transmitting the CPC information better and implementing fast access of the user equipment as well as network and radio-resource optimization.

To achieve the aforementioned objective, the technical solution of the disclosure is implemented as follows:

A method for transmitting Cognitive Pilot Channel (CPC) information includes:

dividing a CPC into a primary CPC for transmitting primary CPC information and a secondary CPC for transmitting secondary CPC information;

loading the primary CPC information periodically into fixed physical resources, and sending the primary CPC information to a user equipment; and after a base station receives a preset triggering event, loading the secondary CPC information into variable physical resources, and sending the secondary CPC information to the user equipment.

The loading the primary CPC information periodically into fixed physical resources may include:

loading, by the base station, the primary CPC information into the fixed physical resources according to a Radio Access Technology (RAT) coverage condition and a preset period;

wherein the primary CPC information may be for radio access of the user equipment, and may include local operator information, local RAT distribution information, and frequency point information corresponding to an RAT; the fixed physical resources may include at least one of a frequency point, a bandwidth, an occupied time slot, and a sending period.

The loading the secondary CPC information into variable physical resources after a base station receives a preset triggering event may include:

after receiving the preset triggering event, loading, by the base station, the secondary CPC information into the variable physical resources of all RATs;

wherein the triggering event may include: UE-entering-deep-fading-period, spectrum selecting, load balancing, handover, and secondary CPC information updating; the secondary CPC information is for optimization of a network or radio resources, and comprises at least one of operator information, RAT distribution information, a frequency point corresponding to an RAT, an operating bandwidth, a transmission parameter requirement, Quality of Service (QoS) supported by an RAT, an available spectrum and an operating bandwidth as well as a transmission parameter requirement thereof, sensing measurement information, service charge information of an RAT, and an optimization command; and the variable physical resources may be physical resources which are shared with another logic channel by way of scheduling for the base station.

A radio access method based on Cognitive Pilot Channel (CPC) information includes: dividing a CPC into a primary CPC for transmitting primary CPC information and a secondary CPC for transmitting secondary CPC information; further includes:

loading, by a base station, the primary CPC information into fixed physical resources preset by a Radio Access Technology (RAT) according to an RAT coverage condition;

performing, by a user equipment, an RAT scanning to determine the RAT for which the primary CPC information is loaded;

reading, by the user equipment, the primary CPC information, and measuring an RAT in the primary CPC information to select an available RAT; and selecting, by the user equipment, an RAT with high priority from the available RAT according to an RAT supported by the user equipment to perform access.

The loading the primary CPC information into fixed physical resources preset by an RAT according to an RAT coverage condition by a base station may include:

when an area divided according to a geographical location or the RAT coverage condition is covered completely by at least one RAT, loading the primary CPC information into fixed physical resources preset by any RAT that completely covers the area; or when an area divided according to a geographical location or the RAT coverage condition cannot be covered completely by at least one RAT, selecting a minimal set of RATs required to cover the area, and loading the primary CPC information into fixed physical resources preset by the set of RATs, wherein the primary CPC information may include: local operator information, local RAT distribution information, and frequency point information corresponding to an RAT; and the fixed physical resources may include at least one of a frequency point, a bandwidth, an occupied time slot, and a sending period.

The performing an RAT scanning to determine the RAT for which the primary CPC information is loaded by a user equipment may include:

performing, by the user equipment, an RAT information scanning according to an RAT order in a pre-stored access RAT priority list as well as fixed-physical-resource loading information; when information is scanned in fixed physical resources corresponding to the fixed-physical-resource loading information, determining the corresponding RAT as the RAT for which the primary CPC information is loaded.

The method may further include: after receiving a triggering event, loading, by the base station, the secondary CPC information into variable physical resources of all RATs, and sending the secondary CPC information to the user equipment, wherein the triggering event comprises UE-entering-deep-fading-period, spectrum selecting, load balancing, handover, and secondary CPC information updating.

When the triggering event received by the base station is the UE-entering-deep-fading-period obtained through statistical analysis by the base station, the loading the secondary CPC information into variable physical resources of all RATs by the base station may include:

loading, by the base station, the secondary CPC information containing an optimization command into physical resources which are shared with another logic channel by way of scheduling for all RATs; and disconnecting, by the user equipment, from a base station according to a disconnecting time indicated by the received secondary CPC information, waiting according to a waiting time indicated by the secondary CPC information, and finally establishing connection with a base station according to a non-competitive preamble and a connection-initiating time indicated by the secondary CPC information.

When the triggering event received by the base station is the spectrum selecting, the loading the secondary CPC information into variable physical resources of all RATs by the base station may include:

loading, by the base station, the secondary CPC information into physical resources which are shared with another logic channel by way of scheduling for all RATs, wherein the secondary CPC information may contain an RAT distribution at a location of the base station, an available spectrum and an operating bandwidth as well as a transmission parameter requirement thereof;

requesting, by the base station, the user equipment to perform sensing measurement on the available spectrum;

performing, by the user equipment, sensing measurement on the available spectrum contained in the received secondary CPC information, and returning a result of the sensing measurement to the base station; and performing, by the base station, spectrum selecting according to the result of the sensing measurement returned by the user equipment and a result of sensing measurement of the available spectrum by the base station.

A radio access system based on Cognitive Pilot Channel (CPC) information includes: a CPC dividing module, a base station, and a user equipment, wherein the CPC dividing module is configured to divide a CPC into a primary CPC for transmitting primary CPC information and a secondary CPC for transmitting secondary CPC information;

the base station is configured to load the primary CPC information into fixed physical resources preset by a Radio Access Technology (RAT) according to an RAT coverage condition; and the user equipment is configured to perform an RAT scanning to determine the RAT for which the primary CPC information is loaded, to read the primary CPC information and measure an RAT in the primary CPC information to select an available RAT, and then to select an RAT with high priority from the available RAT according to an RAT supported by the user equipment to perform access.

The base station may be configured, when an area divided according to a geographical location or the RAT coverage condition is covered completely by at least one RAT, to load the primary CPC information into fixed physical resources preset by any RAT that completely covers the area; or when an area divided according to a geographical location or the RAT coverage condition cannot be covered completely by at least one RAT, to select a minimal set of RATs required to cover the area, and to load the primary CPC information into fixed physical resources preset by the set of RATs;

wherein the primary CPC information may include: local operator information, local RAT distribution information, and frequency point information corresponding to an RAT; and the fixed physical resources may include at least one of a frequency point, a bandwidth, an occupied time slot, and a sending period.

The user equipment may be configured to perform an RAT information scanning according to an RAT order in a pre-stored access RAT priority list as well as fixed-physical-resource loading information, and when information is scanned in fixed physical resources corresponding to the fixed-physical-resource loading information, to determine the corresponding RAT as the RAT for which the primary CPC information is loaded; and to read the primary CPC information.

The base station may further be configured, after receiving a triggering event, to load the secondary CPC information into variable physical resources of all RATs, and to send the secondary CPC information to the user equipment; wherein the triggering event comprises UE-entering-deep-fading-period, spectrum selecting, load balancing, handover, and secondary CPC information updating.

When the triggering event received by the base station is the UE-entering-deep-fading-period obtained through statistical analysis by the base station, the base station may be configured to load the secondary CPC information containing an optimization command into physical resources which are shared with a logic channel by way of scheduling for all RATs; and correspondingly, the user equipment may further be configured to disconnect from a base station according to a disconnecting time indicated by the received secondary CPC information, to wait according to a waiting time indicated by the secondary CPC information, and finally to establish connection with a base station according to a non-competitive preamble and a connection-initiating time indicated by the secondary CPC information.

When the triggering event received by the base station is the spectrum selecting, the base station may be configured to load the secondary CPC information into physical resources which are shared with another logic channel by way of scheduling for all RATs, to request the user equipment to perform sensing measurement on the available spectrum, and to perform spectrum selecting according to a result of sensing measurement returned by the user equipment and a result of sensing measurement of the available spectrum by the base station; wherein the secondary CPC information may contain an RAT distribution at a location of the base station, an available spectrum and an operating bandwidth as well as a transmission parameter requirement thereof;

correspondingly, the user equipment may further be configured to perform the sensing measurement on the available spectrum contained in the received secondary CPC information, and to return the result of the sensing measurement to the base station.

With the disclosure, by dividing a CPC into a primary CPC and a secondary CPC, and by loading, by the base station, the primary CPC information into fixed physical resources of an RAT according to an RAT coverage condition for fast radio access of the user equipment, the amount of information required to be delivered by fixed physical resources is reduced, occupation of fixed physical resources is decreased, thus enabling better transmission of the CPC information required by the user equipment, and speeding up radio access of the user equipment; and after receiving a triggering event, the base station loads the secondary CPC information into variable physical resources and sends the secondary CPC information to the user equipment, so as to implement optimization of a user network and radio resources.

DETAILED DESCRIPTION

The basic idea of the disclosure is that: a CPC is divided into a primary CPC for transmitting primary CPC information and a secondary CPC for transmitting secondary CPC information; the primary CPC information is loaded periodically into fixed physical resources, and sent to a user equipment; and after a base station receives a preset triggering event, the secondary CPC information is loaded into variable physical resources, and sent to the user equipment.

Wherein, the primary CPC information includes local operator information, local RAT distribution information, and frequency point information corresponding to an RAT.

To clarify an objective, technology solution, and advantage of the disclosure, the disclosure is further elaborated below with reference to embodiments and the drawings.

Figure 1:
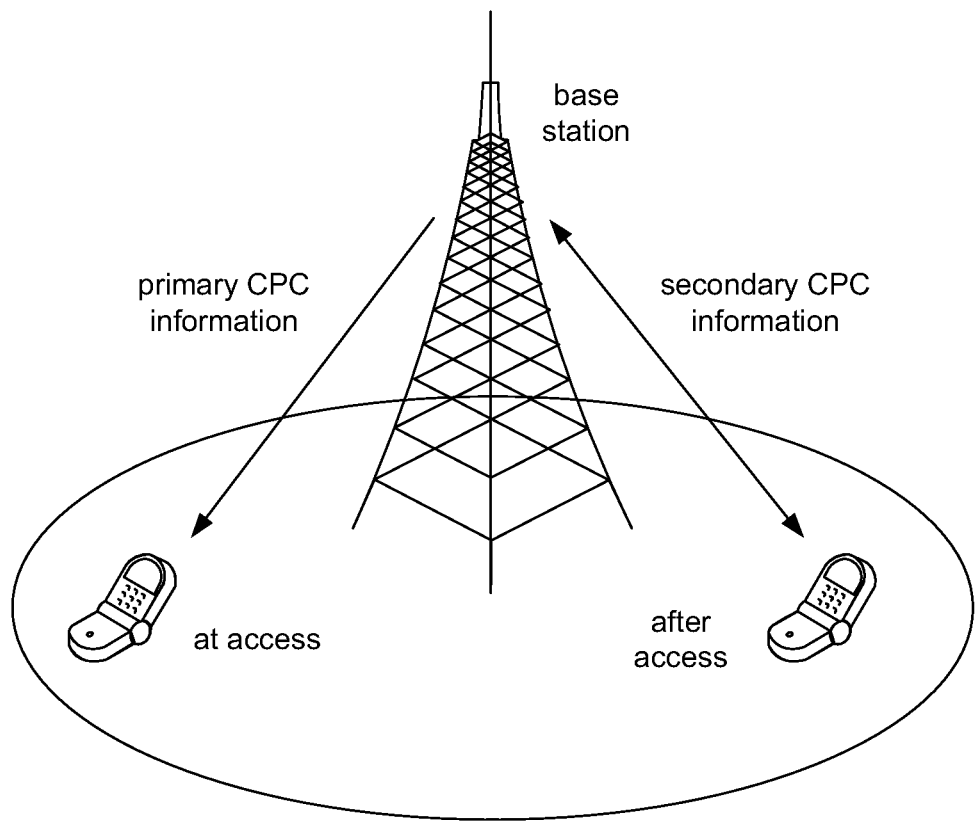
FIG. 1 is a schematic view of a scenario of applying a method for transmitting CPC information provided by the disclosure.

FIG. 1 shows a scenario of applying a method for transmitting CPC information provided by the disclosure; as shown in FIG. 1, primary CPC information transmitted by a primary CPC is mainly for fast access of a user equipment, and is born by preset fixed physical resources; the base station may send the primary CPC information periodically to the user equipment according to a preset time interval, wherein the primary CPC information may include local operator information, local RAT distribution information, frequency point information corresponding to each RAT, and the like;

secondary CPC information transmitted by a secondary CPC is mainly for optimization of a user network or radio resources, and the like, is born by variable physical resources, and is triggered by the user equipment or another sensing network node in a radio communication system based on an event; when the base station receives a triggering event, it sends the secondary CPC information to the user equipment, and interacts with the user equipment, thus implementing network and radio-resource optimization; wherein the secondary CPC information includes at least one of operator information, RAT distribution information, a frequency point, an operating bandwidth, a transmission parameter requirement (information such as maximal transmission power allowed), Quality of Service (QoS) supported by an RAT, an available spectrum and an operating bandwidth as well as a transmission parameter requirement thereof, sensing measurement information, service charge information of each RAT, and an optimization command obtained according to a law of user statistics; and the RAT distribution information and related information thereof in the secondary CPC information, when being sent to the user equipment by the base station, include only RAT distribution information at the location of the user equipment and the related information thereof.

Figure 2:
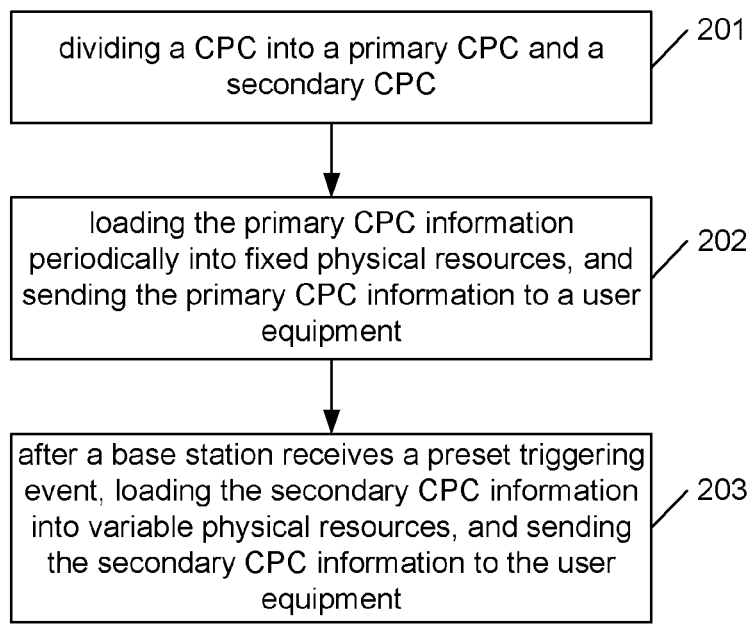
FIG. 2 is a schematic view of a flow for implementing a method for transmitting CPC information provided by the disclosure.

FIG. 2 shows a flow for implementing a method for transmitting CPC information provided by the disclosure; as shown in FIG. 2, the method includes the following steps:

Step 201: dividing a CPC into a primary CPC for transmitting primary CPC information and a secondary CPC for transmitting secondary CPC information.

Step 202: loading the primary CPC information periodically into fixed physical resources, and sending the primary CPC information to a user equipment;

wherein the base station loads the primary CPC information into the fixed physical resources according to an RAT coverage condition and a preset period; the primary CPC information includes local operator information, local RAT distribution information, and frequency point information corresponding to an RAT; the fixed physical resources are for fixed transmission of specific information, and specifically includes at least one of a frequency point, a bandwidth, an occupied time slot, and a sending period.

Step 203: after a base station receives a preset triggering event, loading the secondary CPC information into variable physical resources, and sending the secondary CPC information to the user equipment;

wherein after receiving the preset triggering event, the base station loads the secondary CPC information into the variable physical resources of all RATs; the triggering event includes: UE-entering-deep-fading-period, spectrum selecting, load balancing, handover, secondary CPC information updating, and the like; the secondary CPC information includes at least one of operator information, RAT distribution information, a frequency point, an operating bandwidth, a transmission parameter requirement, Quality of Service (QoS) supported by an RAT, an available spectrum and an operating bandwidth as well as a transmission parameter requirement thereof, sensing measurement information, service charge information of an RAT, and an optimization command; the variable physical resources are physical resources which are shared with another logic channel by way of scheduling for the base station.

Figure 3:
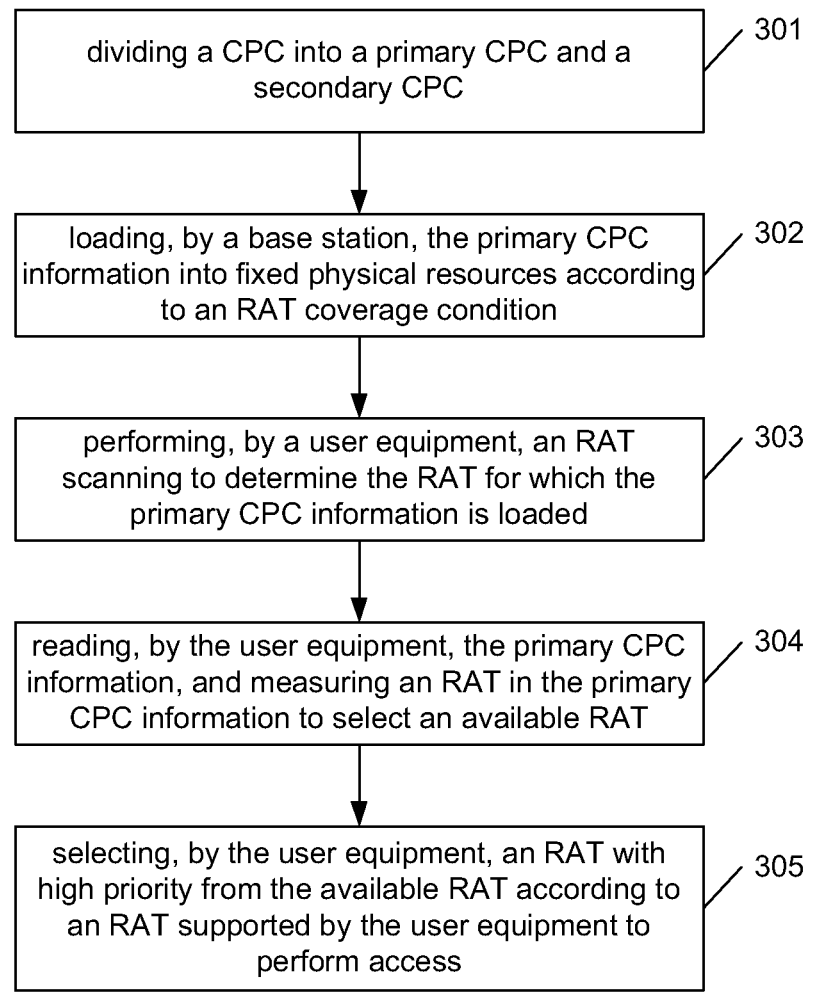
FIG. 3 is a schematic view of a flow for implementing a radio access method based on CPC information provided by the disclosure.

FIG. 3 shows a flow for implementing a radio access method based on CPC information provided by the disclosure; as shown in FIG. 3, the method includes the following steps:

Step 301: dividing a CPC into a primary CPC for transmitting primary CPC information and a secondary CPC for transmitting secondary CPC information.

Step 302: loading, by a base station, the primary CPC information into preset fixed physical resources according to an RAT coverage condition;

in this step, regarding a certain area around the base station, when this area may be covered completely by at least one RAT, the base station loads the primary CPC information into physical resources for fixed transmission of specific information of any RAT that completely covers the area; when this area cannot be covered completely by at least one RAT, the base station selects a minimal set of RATs required to cover the area, and loads the primary CPC information into physical resources for fixed transmission of specific information of this set of RATs; in an embodiment of the disclosure, the primary CPC information is loaded into physical resources for fixed transmission of broadcast information of an RAT;

wherein the area around the base station may be divided by an operator according to the geographical location or the RAT coverage condition, wherein the resources for fixed transmission of specific information may include resources such as a frequency point, a bandwidth, an occupied time slot, and a sending period.

Step 303: performing, by a user equipment, an RAT scanning to determine the RAT for which the primary CPC information is loaded;

wherein the user equipment may perform the RAT scanning according to an access RAT priority list pre-stored in the user equipment, and determine the RAT for which the primary CPC information is loaded;

in this step, when the user equipment prepares to perform a radio communication access, it first performs an RAT information scanning according to an RAT order in the pre-stored access RAT priority list as well as fixed-physical-resource loading information corresponding to each RAT; when performing information scanning with respect to a certain RAT, and when information is scanned in fixed physical resources corresponding to the fixed-physical-resource loading information, the user equipment determines this RAT as the RAT for which the primary CPC information is loaded; for example, when the RAT order in the access RAT priority list is: Long Term Evolution (LTE), Global System for Mobile communications (GSM), Wireless LAN (WLAN), and the fixed-physical-resource loading information corresponding to the LTE, GSM, WLAN is frequency point sets A, B, C, respectively, then the user equipment scans the aforementioned RATs one by one; when scanning with respect to the LTE, the user equipment scans information at a certain frequency point of the frequency point set A, and then determines the LTE as the RAT for which the primary CPC information is loaded. When the fixed physical resources being a certain resource block of resources where the broadcast information is located, and when scanning with respect to the LTE, the user equipment scans information on this resource block and then determines the LTE as the RAT for which the primary CPC information is loaded.

Step 304: reading, by the user equipment, the primary CPC information, and measuring an RAT in the primary CPC information to select an available RAT;

in this step, the primary CPC information includes local operator information, local RAT distribution information, frequency point information corresponding to each RAT, and the like;

assuming that the local RAT distribution information included in the primary CPC information loaded into the LTE broadcast information in step 303 read by the user equipment is: LTE, WLAN and GSM, the user equipment measures the three RATs to select an available RAT including the LTE and the WLAN.

Step 305: selecting, by the user equipment, an RAT with high priority from the available RAT according to an RAT supported by the user equipment to perform access;

wherein the user equipment may select the RAT with high priority from the available RAT to perform the access according to a priority in a pre-stored RAT list supported by the user equipment;

assuming that, in this step, the priority in the pre-stored RAT list supported by the user equipment is: WLAN, GSM, LTE, and a Universal Mobile Telecommunications System (UMTS); and the available RAT obtained in step 304 includes the LTE and the WLAN, then the user equipment selects the WLAN with high priority to perform access.

Figure 4:
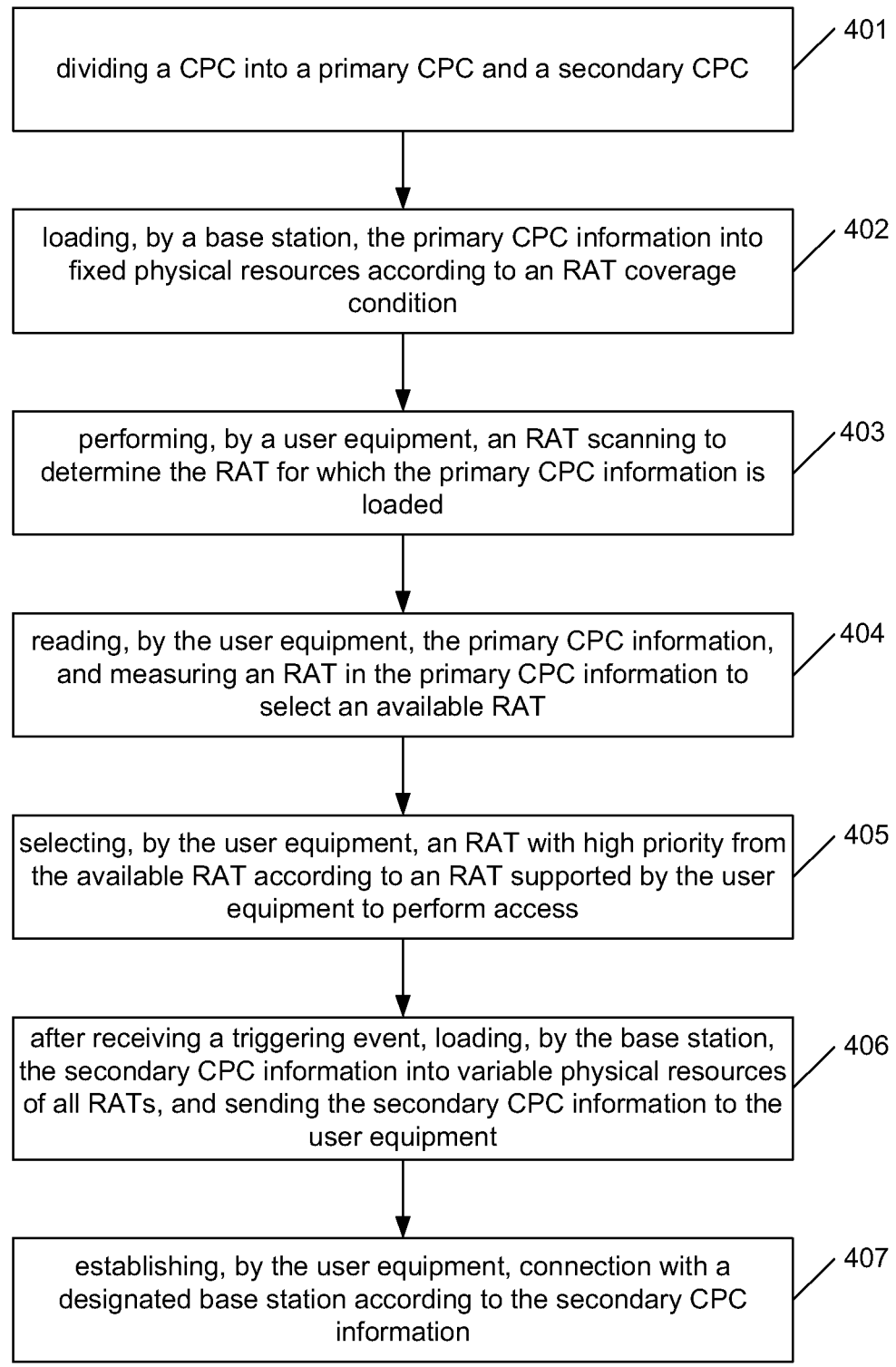
FIG. 4 is a schematic view of a flow for implementing Embodiment 1 of a radio access method based on CPC information provided by the disclosure.

FIG. 4 shows a flow for implementing Embodiment 1 of the radio access method based on CPC information provided by the disclosure; the embodiment of the disclosure specifically describes the process of performing network or resource optimization by using the secondary CPC information; as shown in FIG. 4, Embodiment 1 includes the following steps:

Step 401 to step 405 are the same as step 301 to step 305, and mainly describe the process of implementing, by the user equipment, fast radio access by using the primary CPC information, which is not further elaborated here.

Step 406: after receiving a triggering event, loading, by the base station, the secondary CPC information into variable physical resources of all RATs, and sending the secondary CPC information to the user equipment;

wherein the triggering event may include UE-entering-deep-fading-period, spectrum selecting, load balancing, handover, and secondary CPC information updating.

During a practical application, by long time statistics of the user equipment, the base station finds that the user equipment will have a relative large probability to enter long time deep fading within a certain time period. To avoid constant searching for a signal by the user during this period, the base station will send an optimization command to the user; in the embodiment of the disclosure, the triggering event is the UE-entering-deep-fading-period obtained through statistical analysis by the base station, and the base station loads the secondary CPC information containing an optimization command into variable physical resources of all RATs; wherein the variable physical resources refer to physical resources which are shared with another logic channel by way of scheduling for the base station, for example physical resources for transmitting traffic data, and the like;

wherein the secondary CPC information includes the parameter when the user equipment disconnects and when the user equipment re-initiates connection, information required in connection, such as a non-competitive preamble, the base station to be connected to, and the like.

Step 407: establishing, by the user equipment, connection with a designated base station according to the received secondary CPC information;

specifically, the user equipment disconnects from a base station according to a disconnecting time indicated by the received secondary CPC information, waits according to a waiting time indicated by the secondary CPC information, and finally establishes connection with a designated base station according to a non-competitive preamble and a connection-initiating time indicated by the secondary CPC information.

It should be understood that in the embodiment of the disclosure, implementing network or resource optimization refers to that after the user equipment has accessed and camped on a proper cell, and in case the base station has received the triggering event, the user equipment may perform the process of network or resource optimization, wherein the process of radio access of the user equipment is not limited to the process as shown by step 401 to step 405.

Figure 5:
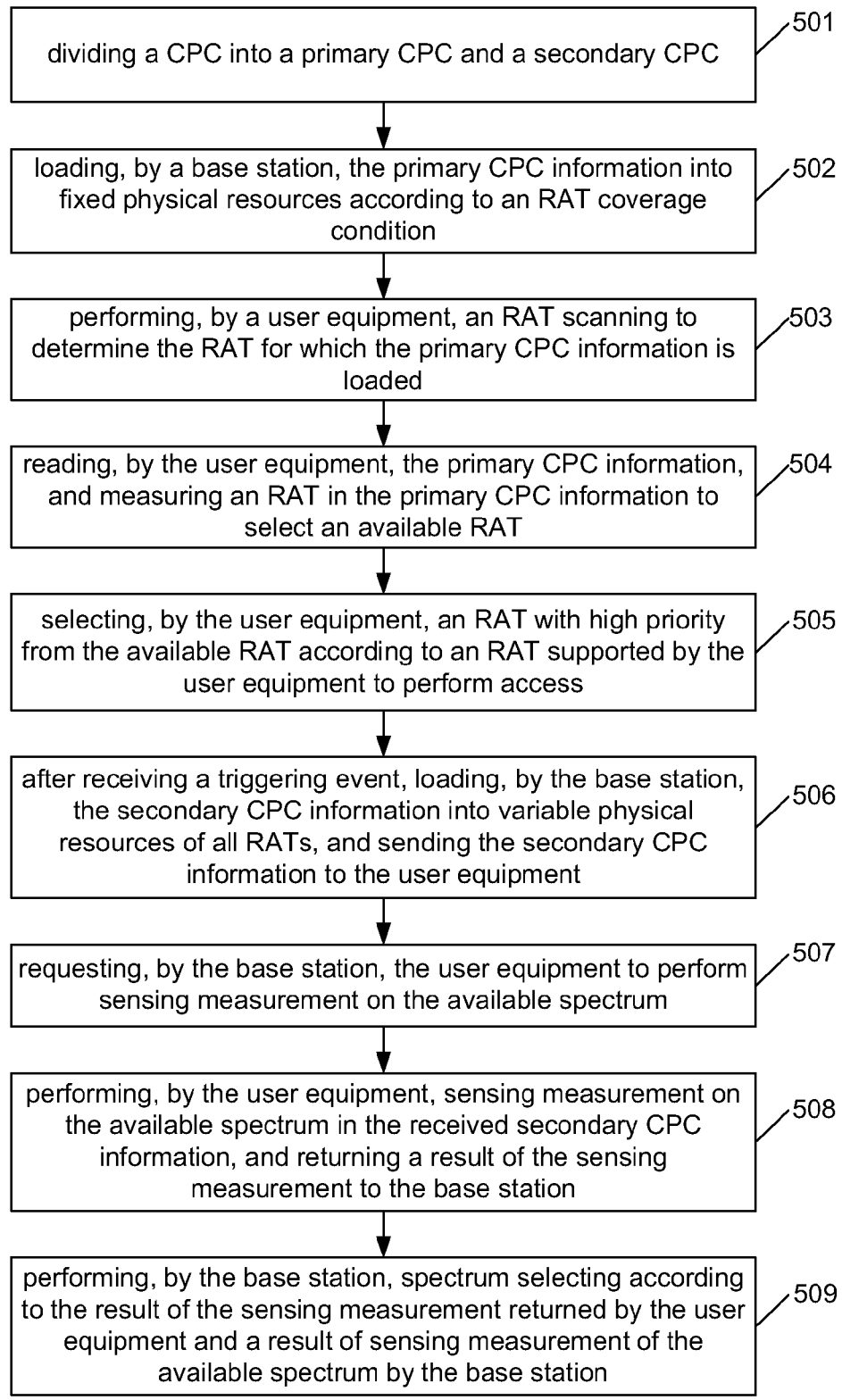
FIG. 5 is a schematic view of a flow for implementing Embodiment 2 of a radio access method based on CPC information provided by the disclosure.

FIG. 5 shows a flow for implementing Embodiment 2 of the radio access method based on CPC information provided by the disclosure; the embodiment of the disclosure specifically describes the process of spectrum selecting by using the secondary CPC information; as shown in FIG. 5, Embodiment 2 includes the following steps:

Step 501 to step 505 are the same as step 301 to step 305, and mainly describe the process of implementing, by the user equipment, fast radio access by using the primary CPC information, which is not further elaborated here;

Step 506: after receiving a triggering event, loading, by the base station, the secondary CPC information into variable physical resources of all RATs, and sending the secondary CPC information to the user equipment;

wherein the triggering event may include UE-entering-deep-fading-period, spectrum selecting, load balancing, handover, and secondary CPC information updating.

In the embodiment of the disclosure, the triggering event received by the base station is the spectrum selecting, and the base station loads the secondary CPC information into the variable physical resources of all RATs; wherein the variable physical resources refer to physical resources which are shared with another logic channel by way of scheduling for the base station, such as physical resources for transmitting traffic data, and the like;

wherein the secondary CPC information includes information for delivering the RAT distribution at the location of the base station, an available spectrum and an operating bandwidth as well as a transmission parameter requirement thereof, and the like .

Step 507: requesting, by the base station, the user equipment to perform sensing measurement on the available spectrum.

Step 508: performing, by the user equipment, sensing measurement on the available spectrum contained in the received secondary CPC information, and returning a result of the sensing measurement to the base station.

Step 509: performing, by the base station, spectrum selecting according to the result of the sensing measurement returned by the user equipment and a result of sensing measurement of the available spectrum by the base station.

It should be understood that in the embodiment of the disclosure, the spectrum selecting refers to that when the base station has multiple spectra (idle spectra resources of a master system) available, the base station interacts with the user equipment accessing via radio by using the secondary CPC information born by variable physical resources, and decides which spectrum to select, wherein the process of radio access of the user equipment is not limited to the process as shown by step 501 to step 505.

The disclosure further provides a radio access system based on CPC information, and the system includes: a CPC dividing module, a base station, and a user equipment, wherein the CPC dividing module is configured to divide a CPC into a primary CPC for transmitting primary CPC information and a secondary CPC for transmitting secondary CPC information;

the base station is configured to load the primary CPC information into fixed physical resources preset by an RAT according to an RAT coverage condition; and the user equipment is configured to perform an RAT scanning to determine the RAT for which the primary CPC information is loaded, to read the primary CPC information and measure an RAT in the primary CPC information to select an available RAT, and then to select an RAT with high priority from the available RAT according to an RAT supported by the user equipment to perform access. It should be understood that the CPC dividing module provided in the embodiment of the disclosure may also be configured inside the base station.

Moreover, the base station is specifically configured to, when an area divided according to a geographical location or the RAT coverage condition is covered completely by at least one RAT, load the primary CPC information into fixed physical resources preset by any RAT that completely covers the area; or when the area divided according to a geographical location or the RAT coverage condition cannot be covered completely by at least one RAT, to select a minimal set of RATs required to cover the area, and to load the primary CPC information into fixed physical resources preset by the set of RATs; in the embodiment of the disclosure, the primary CPC information is loaded into physical resources for fixed transmission of specific information of an RAT, wherein resources for fixed transmission of specific information may include resources such as a frequency point, a bandwidth, an occupied time slot, and a sending period; the primary CPC information includes local operator information, local RAT distribution information, and frequency point information corresponding to an RAT.

Moreover, the user equipment is specifically configured to perform an RAT information scanning according to an RAT order in a pre-stored access RAT priority list as well as fixed-physical-resource loading information corresponding to each RAT, when information is scanned in fixed physical resources corresponding to the fixed-physical-resource loading information, to determine a corresponding RAT as the RAT for which the primary CPC information is loaded; and to read the primary CPC information; for example, when the RAT order in the access RAT priority list is LTE, GSM, and WLAN, and the fixed-physical-resource loading information corresponding to the LTE, GSM, WLAN is frequency point sets A, B, C, respectively, then the user equipment scans the aforementioned RATs one by one; when scanning with respect to the LTE, the user equipment scans information at a certain frequency point of the frequency point set A, and then determines the LTE as the RAT for which the primary CPC information is loaded. When the fixed physical resources being a certain resource block of resources where the broadcast information is located, and when scanning with respect to the LTE, the user equipment scans information on this resource block and then determines the LTE as the RAT for which the primary CPC information is loaded.

Wherein, the base station is further configured to, after receiving a triggering event, load the secondary CPC information into variable physical resources of all RATs, and to send the secondary CPC information to the user equipment, wherein the triggering event includes UE-entering-deep-fading-period, spectrum selecting, load balancing, handover, and secondary CPC information updating.

Wherein, when receiving a triggering event of UE-entering-deep-fading-period obtained through statistical analysis, the base station is configured to load the secondary CPC information containing an optimization command into physical resources which are shared with a logic channel by way of scheduling for all RATs; specifically, during a practical application, by long time statistics of the user equipment, the base station finds that the user equipment will have a relative large probability to enter long time deep fading within a certain time period.

To avoid constant searching for a signal by the user during this period, the base station will send an optimization command to the user; the secondary CPC information includes the parameter when the user equipment disconnects and when the user equipment re-initiates connection, information required in connection, such as a non-competitive preamble, the base station to be connected to, and the like.

Correspondingly, the user equipment is further configured to disconnect from a base station according to a disconnecting time indicated by the received secondary CPC information, and to wait according to a waiting time indicated by the secondary CPC information, and finally to establish connection with a designated base station according to a non-competitive preamble and a connection-initiating time indicated by the secondary CPC information.

Wherein, when receiving a triggering event of spectrum selecting, the base station is specifically configured to load the secondary CPC information into physical resources which are shared with another logic channel by way of scheduling for all RATs, to request the user equipment to perform sensing measurement on the available spectrum, and to perform spectrum selecting according to a result of sensing measurement returned by the user equipment and a result of sensing measurement of the available spectrum by the base station, wherein the secondary CPC information includes information for delivering an RAT distribution at a location of the base station, an available spectrum and an operating bandwidth as well as a transmission parameter requirement thereof, and the like.

Correspondingly, the user equipment is further configured to perform sensing measurement on the available spectrum contained in the received secondary CPC information, and to return the result of the sensing measurement to the base station.

What described are merely preferred embodiments of the disclosure, and are not intended to limit the scope of the disclosure.

What is claimed is:

1. A method for transmitting Cognitive Pilot Channel (CPC) information, comprising:
   dividing a CPC into a primary CPC for transmitting primary CPC information and a secondary CPC for transmitting secondary CPC information;
   loading the primary CPC information periodically into fixed physical resources, and sending the primary CPC information to a user equipment; and
   after a base station receives a preset triggering event, loading the secondary CPC information into variable physical resources, and sending the secondary CPC information to the user equipment;
   wherein the loading the primary CPC information periodically into fixed physical resources comprises:
   loading, by the base station, the primary CPC information into the fixed physical resources according to a Radio Access Technology (RAT) coverage condition and a preset period;
   wherein the primary CPC information is for radio access of the user equipment, and comprises local operator information, local RAT distribution information, and frequency point information corresponding to an RAT; the fixed physical resources comprise at least one of a frequency point, a bandwidth, an occupied time slot, and a sending period.

2. The method according to claim 1, wherein the loading the primary CPC information into the fixed physical resources according to a Radio Access Technology (RAT) coverage condition and a preset period by the base station comprises:
   when an area divided according to a geographical location or the RAT coverage condition is covered completely by at least one RAT, loading the primary CPC information into fixed physical resources preset by any RAT that completely covers the area; or
   when an area divided according to a geographical location or the RAT coverage condition cannot be covered completely by at least one RAT, selecting a minimal set of RATs required to cover the area, and loading the primary CPC information into fixed physical resources preset by the set of RATs.

3. The method according to claim 1, wherein the loading the secondary CPC information into variable physical resources after a base station receives a preset triggering event comprises:
   after receiving the preset triggering event, loading, by the base station, the secondary CPC information into the variable physical resources of all RATs;
   wherein the triggering event comprises: UE-entering-deep-fading-period, spectrum selecting, load balancing, handover, and secondary CPC information updating; the secondary CPC information is for optimization of a network or radio resources, and comprises at least one of operator information, RAT distribution information, a frequency point corresponding to an RAT, an operating bandwidth, a transmission parameter requirement, Quality of Service (QoS) supported by an RAT, an available spectrum and an operating bandwidth as well as a transmission parameter requirement thereof, sensing measurement information, service charge information of an RAT, and an optimization command; and the variable physical resources are physical resources which are shared with another logic channel by way of scheduling for the base station.

4. A radio access method based on Cognitive Pilot Channel (CPC) information, comprising: dividing a CPC into a primary CPC for transmitting primary CPC information and a secondary CPC for transmitting secondary CPC information;
further comprising:
   receiving, by a user equipment, the primary CPC information which is loaded into fixed physical resources preset by a Radio Access Technology (RAT) according to an RAT coverage condition;
   performing, by the user equipment, an RAT scanning to determine the RAT for which the primary CPC information is loaded;
   reading, by the user equipment, the primary CPC information, and measuring an RAT in the primary CPC information to select an available RAT; and selecting, by the user equipment, an RAT with high priority from the available RAT according to an RAT supported by the user equipment to perform access;

wherein the receiving the primary CPC information which is loaded into fixed physical resources preset by a Radio Access Technology (RAT) according to an RAT coverage condition by a user equipment comprises:

when an area divided according to a geographical location or the RAT coverage condition is covered completely by at least one RAT, receiving, by the user equipment, the primary CPC information which is loaded into fixed physical resources preset by any RAT that completely covers the area; or when an area divided according to a geographical location or the RAT coverage condition cannot be covered completely by at least one RAT, receiving, by the user equipment, the primary CPC information which is loaded into fixed physical resources preset by a minimal set of RATs required to cover the area, wherein the primary CPC information comprises: local operator information, local RAT distribution information, and frequency point information corresponding to an RAT; and the fixed physical resources comprise at least one of a frequency point, a bandwidth, an occupied time slot, and a sending period;

wherein the performing an RAT scanning to determine the RAT for which the primary CPC information is loaded by the user equipment comprises:

performing, by the user equipment, an RAT information scanning according to an RAT order in a pre-stored access RAT priority list as well as fixed-physical-resource loading information; when information is scanned in fixed physical resources corresponding to the fixed-physical-resource loading information, determining the corresponding RAT as the RAT for which the primary CPC information is loaded.

5. The method according to claim 4, further comprising:
receiving, by the user equipment, the secondary CPC information which is loaded into variable physical resources of all RATs after receiving a triggering event;
wherein the triggering event comprises UE-entering-deep-fading-period, spectrum selecting, load balancing, handover, and secondary CPC information updating.

6. The method according to claim 5, wherein when the received triggering event is the UE-entering-deep-fading-period obtained through statistical analysis, the receiving the secondary CPC information which is loaded into variable physical resources of all RATs after receiving a triggering event by the user equipment comprises:
receiving, by the user equipment, the secondary CPC information containing an optimization command which is loaded into physical resources which are shared with another logic channel by way of scheduling for all RATs; and
disconnecting, by the user equipment, from a base station according to a disconnecting time indicated by the received secondary CPC information, waiting according to a waiting time indicated by the secondary CPC information, and finally establishing connection with a base station according to a non-competitive preamble and a connection-initiating time indicated by the secondary CPC information.

7. The method according to claim 5, wherein when the received triggering event is the spectrum selecting, the receiving the secondary CPC information which is loaded into variable physical resources of all RATs after receiving a triggering event by the user equipment comprises:

receiving, by the user equipment, the secondary CPC information which is loaded into physical resources which are shared with another logic channel by way of scheduling for all RATs, wherein the secondary CPC information contains an RAT distribution at a location of the base station, an available spectrum and an operating bandwidth as well as a transmission parameter requirement thereof;

receiving, by the user equipment, a request to perform sensing measurement on the available spectrum; and performing, by the user equipment, sensing measurement on the available spectrum contained in the received secondary CPC information, and returning a result of the sensing measurement for the base station to perform spectrum selecting according to the result of the sensing measurement returned by the user equipment and a result of sensing measurement of the available spectrum by the base station.

8. A radio access system based on Cognitive Pilot Channel (CPC) information, comprising a user equipment which is configured, when dividing a CPC into a primary CPC for transmitting primary CPC information and a secondary CPC for transmitting secondary CPC information, to receive the primary CPC information which is loaded into fixed physical resources preset by a Radio Access Technology (RAT) according to an RAT coverage condition, to perform an RAT scanning to determine the RAT for which the primary CPC information is loaded, to read the primary CPC information and measure an RAT in the primary CPC information to select an available RAT, and then to select an RAT with high priority from the available RAT according to an RAT supported by the user equipment to perform access;

wherein the user equipment is configured, when an area divided according to a geographical location or the RAT coverage condition is covered completely by at least one RAT, to receive the primary CPC information which is loaded into fixed physical resources preset by any RAT that completely covers the area; or the user equipment is configured, when an area divided according to a geographical location or the RAT coverage condition cannot be covered completely by at least one RAT, to receive the primary CPC information which is loaded into fixed physical resources preset by a minimal set of RATs required to cover the area;

wherein the primary CPC information comprises: local operator information, local RAT distribution information, and frequency point information corresponding to an RAT; and the fixed physical resources comprise at least one of a frequency point, a bandwidth, an occupied time slot, and a sending period;

wherein the user equipment is configured to perform an RAT information scanning according to an RAT order in a pre-stored access RAT priority list as well as fixed-physical-resource loading information, and when information is scanned in fixed physical resources corresponding to the fixed-physical-resource loading information, to determine the corresponding RAT as the RAT for which the primary CPC information is loaded; and to read the primary CPC information.

9. The system according to claim 8, wherein the user equipment is further configured to receive the secondary CPC information which is loaded into variable physical resources of all RATs after receiving a triggering event; wherein the triggering event comprises UE-entering-deep-fading-period, spectrum selecting, load balancing, handover, and secondary CPC information updating.

10. The system according to claim 9, wherein when the triggering event received by the base station is the UE-entering-deep-fading-period obtained through statistical analysis by the base station, the user equipment is further configured to receive the secondary CPC information containing an optimization command which is loaded into physical resources which are shared with a logic channel by way of scheduling for all RATs; and the user equipment is further configured to disconnect from a base station according to a disconnecting time indicated by the received secondary CPC information, to wait according to a waiting time indicated by the secondary CPC information, and finally to establish connection with a base station according to a non-competitive preamble and a connection-initiating time indicated by the secondary CPC information.

11. The system according to claim 9, wherein when the triggering event received by the base station is the spectrum selecting, the user equipment is further configured to receive the secondary CPC information which is loaded into physical resources which are shared with another logic channel by way of scheduling for all RATs, to receive a request to perform sensing measurement on the available spectrum, to perform sensing measurement on the available spectrum contained in the received secondary CPC information, and to return a result of the sensing measurement for the base station to perform spectrum selecting according to the result of the sensing measurement returned by the user equipment and a result of sensing measurement of the available spectrum by the base station; wherein the secondary CPC information contains an RAT distribution at a location of the base station, an available spectrum and an operating bandwidth as well as a transmission parameter requirement thereof.

12. A radio access system based on Cognitive Pilot Channel (CPC) information, comprising a base station which is configured to divide a CPC into a primary CPC for transmitting primary CPC information and a secondary CPC for transmitting secondary CPC information, to load the primary CPC information into fixed physical resources preset by a Radio Access Technology (RAT) according to an RAT coverage condition for a user equipment to perform an RAT scanning to determine the RAT for which the primary CPC information is loaded, for the user equipment to read the primary CPC information and measure an RAT in the primary CPC information to select an available RAT, and for the user equipment to select an RAT with high priority from the available RAT according to an RAT supported by the user equipment to perform access;

wherein the base station is further configured, after receiving a triggering event, to load the secondary CPC information into variable physical resources of all RATs, and to send the secondary CPC information; wherein the triggering event comprises UE-entering-deep-fading-period, spectrum selecting, load balancing, handover, and secondary CPC information updating.

13. The system according to claim 12, wherein the base station is configured, when an area divided according to a geographical location or the RAT coverage condition is covered completely by at least one RAT, to load the primary CPC information into fixed physical resources preset by any RAT that completely covers the area; or when an area divided according to a geographical location or the RAT coverage condition cannot be covered completely by at least one RAT, to select a minimal set of RATs required to cover the area, and to load the primary CPC information into fixed physical resources preset by the set of RATs;

wherein the primary CPC information comprises: local operator information, local RAT distribution information, and frequency point information corresponding to an RAT; and the fixed physical resources comprise at least one of a frequency point, a bandwidth, an occupied time slot, and a sending period.

14. The system according to claim 12, wherein when the triggering event received by the base station is the UE-entering-deep-fading-period obtained through statistical analysis by the base station, the base station is configured to load the secondary CPC information containing an optimization command into physical resources which are shared with a logic channel by way of scheduling for all RATs for the user equipment to disconnect from a base station according to a disconnecting time indicated by the received secondary CPC information, for the user equipment to wait according to a waiting time indicated by the secondary CPC information, and for the user equipment to establish connection with a base station according to a non-competitive preamble and a connection-initiating time indicated by the secondary CPC information; or when the triggering event received by the base station is the spectrum selecting, the base station is configured to load the secondary CPC information into physical resources which are shared with another logic channel by way of scheduling for all RATs, to request the user equipment to perform sensing measurement on the available spectrum, and to perform spectrum selecting according to a result of sensing measurement returned by the user equipment and a result of sensing measurement of the available spectrum by the base station; wherein the secondary CPC information contains an RAT distribution at a location of the base station, an available spectrum and an operating bandwidth as well as a transmission parameter requirement thereof.

* * * * *